Oct. 9, 1934.  W. D. ARCHEA  1,976,103
MILLING MACHINERY
Filed Oct. 22, 1929   10 Sheets-Sheet 1

Inventor
WALTER D. ARCHEA
By A. H. Parsons
Attorney

Oct. 9, 1934.  W. D. ARCHEA  1,976,103
MILLING MACHINERY
Filed Oct. 22, 1929   10 Sheets-Sheet 2

Inventor
WALTER D. ARCHEA
By AH Parsons
Attorney

Oct. 9, 1934.   W. D. ARCHEA   1,976,103
MILLING MACHINERY
Filed Oct. 22, 1929   10 Sheets-Sheet 6

Oct. 9, 1934.  W. D. ARCHEA  1,976,103
MILLING MACHINERY
Filed Oct. 22, 1929  10 Sheets-Sheet 7

Inventor
WALTER D. ARCHEA
By  HK Parsons
Attorney

Oct. 9, 1934.     W. D. ARCHEA     1,976,103
MILLING MACHINERY
Filed Oct. 22, 1929     10 Sheets-Sheet 9

Inventor
WALTER D. ARCHEA
By HH Parsons
Attorney

Oct. 9, 1934.  W. D. ARCHEA  1,976,103
MILLING MACHINERY
Filed Oct. 22, 1929      10 Sheets—Sheet 10

Inventor
WALTER D. ARCHEA
By  A.H.K. Parsons
Attorney

Patented Oct. 9, 1934

1,976,103

UNITED STATES PATENT OFFICE 1,976,103

MILLING MACHINERY

Walter D. Archea, Cincinnati, Ohio, assignor to The Cincinnati Milling Machine Company, Cincinnati, Ohio, a corporation of Ohio Application October 22, 1929, Serial No. 401,519

26 Claims. (Cl. 90—20)

This invention relates to improvements in milling machines and especially to a continuous type of milling machine wherein a plurality of operations are successively performed on a plurality of work pieces.

An object of this invention is to provide a machine of this type for presenting a work piece to successive milling cutters of different configurations for accurately finishing the said work piece.

Another object of this invention is to provide a machine of this type for presenting a plurality of work pieces to successive cutting tools to perform sequential operations on the work pieces.

Another object of this invention is to provide in a machine of this type improved means for controlling the rate of rotation of the table or support which carries the plurality of work pieces past successive cutting tools.

Another object of this invention is to provide in a machine for performing a plurality of operations on successive work pieces, improved means for rapidly advancing the work piece from station to station and slowly feeding the work piece past the station at a feeding rate.

Further objects and advantages of the present invention should be readily understood by referring to the following specifications, considered in conjunction with the drawings forming a part thereof, and it is to be understood that any modifications may be made in the exact structure hereinafter described within the scope of the appended claims, without departing from or exceeding the spirit of the invention.

Throughout the several views of the drawings, the same reference characters are utilized to indicate the same or similar parts.

In the drawings, the reference character 25 indicates a bed having rotatably mounted thereon a table 26 adapted to support a plurality of work pieces and move same so that one end engages a plurality of cutting tools 27 supported centrally of the bed on a stationary pedestal or support 28. A housing 29 is mounted adjacent one side of the bed 25 and supports a slide 143 carrying a cutter 30 movable with a vertical spindle and adjustable about a horizontal axis, which cutter operates on the opposite ends of the work pieces. A gear box or speed box 31 is mounted on the other end of the bed, to control the rotation of the cutters 27 and table 26 driven from a suitable source of power or actuating mechanism contained within the housing 29. The work pieces are individually mounted and clamped in fixtures 26A secured to and carried by the table 26.

From the foregoing description it will be noted that a plurality of work pieces may be mounted on the rotating table 26 and carried past revolving cutter tools or the like 27 and 30, to form or shape the opposite ends of a plurality of work pieces.

Figure 5:
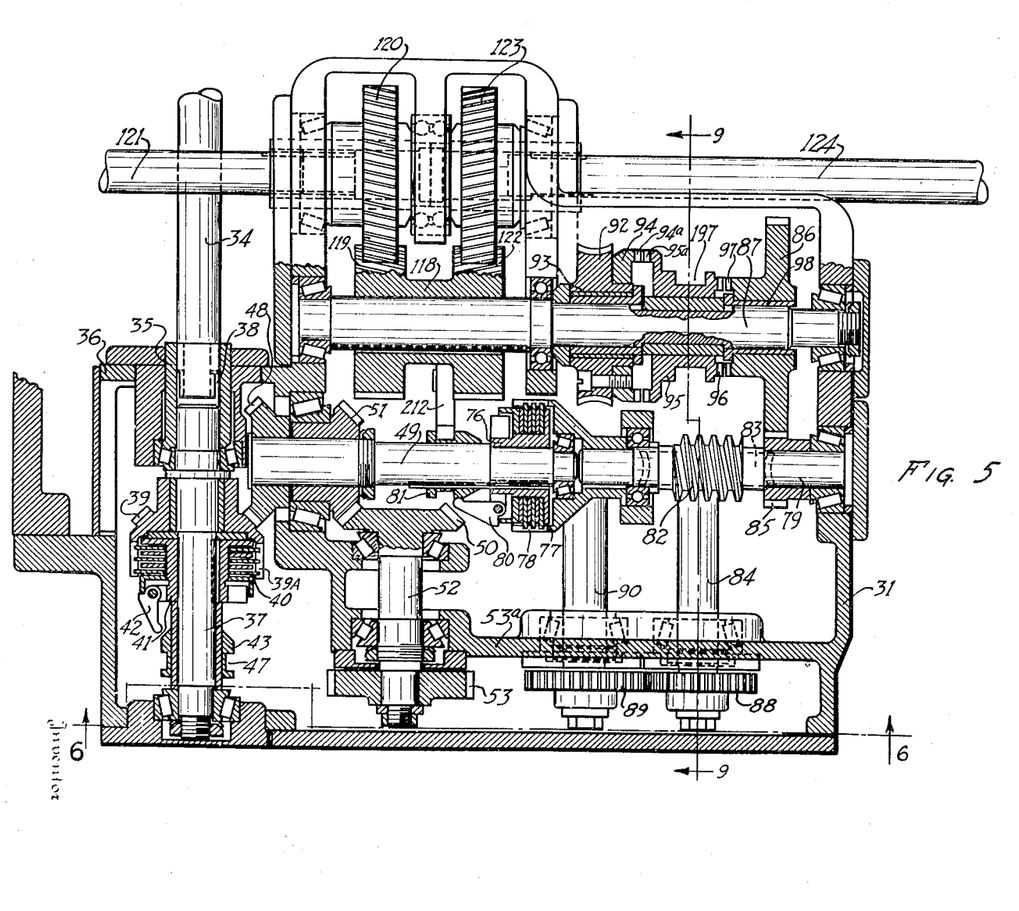
Figure 5 is a sectional view taken on line 5—5 of Figure 2.

Mounted within the housing 29 is a motor 32, geared by silent chain 33 to drive shaft 34, which extends beyond the housing 29 into and through the bed 25 to the gear or speed box 31. The drive shaft 34 is telescopically keyed within a sleeve 35 carried by the housing 36 of the speed or gear box 31. A stub shaft 37 extends from the other end of the sleeve 35 and is keyed thereto by a key 38 whereby drive shaft 34 and stub shaft 37 move together as a unit. A bevel gear 39 is loosely carried by the stub shaft 37 intermediate its ends and is provided with a circular flange 39A, to which alternate discs of a disc clutch 40 are secured. Keyed to the shaft 37 within the flange 39A is a hub 41, to which the intermediate discs of the clutch 40 are secured. Pivoted to the flange, integral with the hub 41, are clutch fingers 42 adapted to be actuated by clutch spool 43 slidable along but not rotatable relative to the shaft 37. When it is desired to actuate the gears within the gear box 31, clutch spool 43 is shifted to the rear, as seen in Figure 5, to actuate the fingers 42 outwardly about their pivots to frictionally engage the discs of friction disc clutch 40 to transmit power through the shaft 34 to the bevel gear 39. The mechanism for shifting the clutch spool 43 includes the starting lever 44 (see Figure 6), keyed or otherwise secured to one end of shaft 45, which has on its other end a shifter fork 46, the arms of which engage within the groove 47 formed within clutch spool 43.

Figures 7, 8:
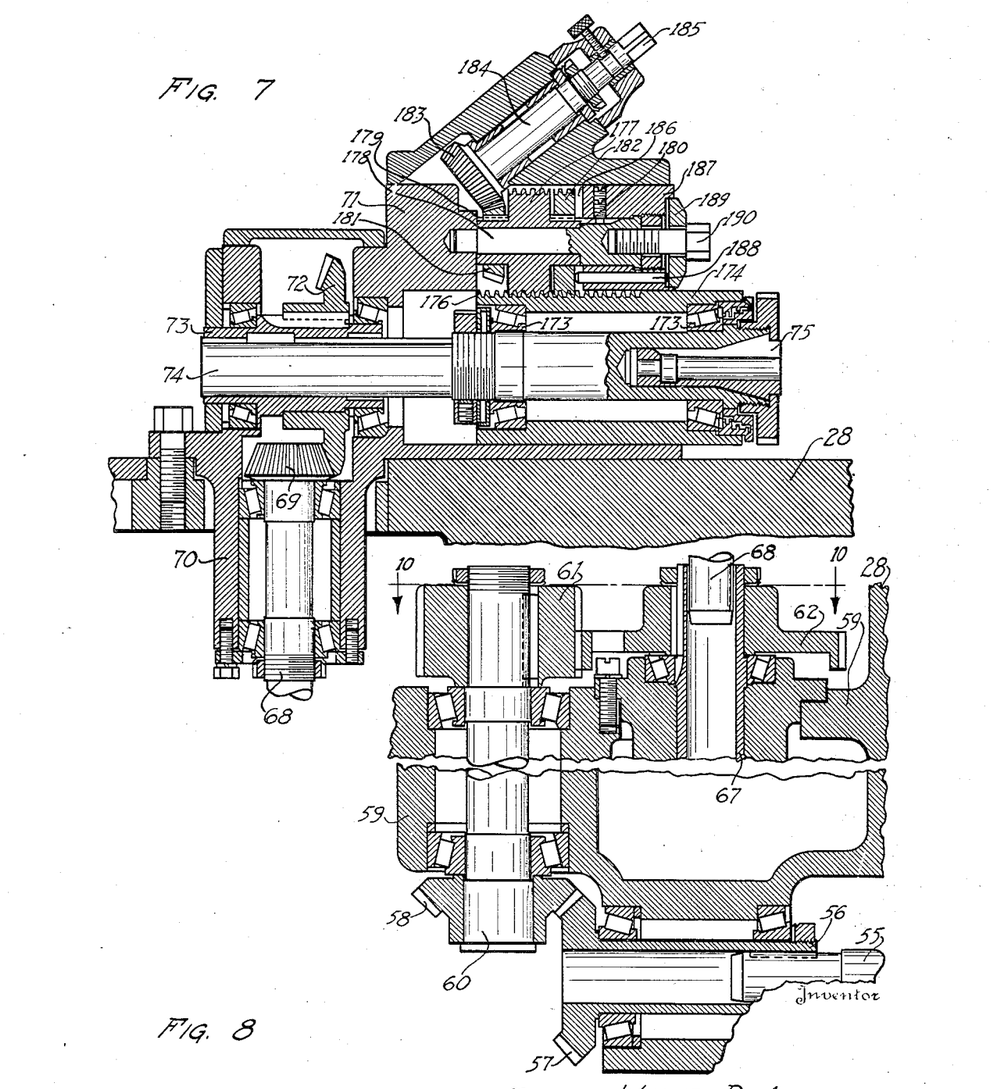
Figure 7 is a fragmentary sectional view taken on line 7—7 of Figure 1.
Figure 8 is a continuation of Figure 7, showing the structure within the bed of the machine below that shown in Figure 7.

Meshing with bevel gear 39 is a bevel gear 48, secured to intermediate shaft 49, which shaft is journaled in anti-friction bearings carried by the housing 36 of gear box 31. Transmission gearing extend from intermediate shaft 49 to the spindles carrying cutters 27, as well as to the driving mechanism for rotating the rotary table 26. The gearing or transmission line for the horizontal spindles of cutters 27 will first be described and this includes a bevel gear 50, enmesh with a bevel gear 51, secured to and driven by intermediate shaft 49. The bevel gear 50 has extending from it a stem 52, journaled in the forward wall 53a of the housing 36. Secured on the end of stem 52 is a gear 53 enmesh with a gear 54 on the end of rearwardly extending transmission shaft 55. Shaft 55 is provided with splines (see Figure 8), where it telescopes within sleeve 56 and engages keys formed therein, and the sleeve 56 has formed on one end a bevel gear 57 enmesh with a corresponding bevel gear 58. The bevel gear 57 and integral sleeve 56 are mounted in anti-friction bearings supported in the lower portion of a housing 59 integral with or secured to the pedestal or support 28 located centrally of the rotary table 26. The pinions 57 and 58 constitute the main or common drive for all of the spindles carried by the pedestal 28. This common drive includes a shaft 60 to which is keyed the bevel pinion 58, whereby it is rotated and has mounted on its upper end a relatively wide faced spur pinion 61. Spaced circumferentially of the pinion 61 is a plurality of gears 62, 63, 64, 65 and 66, one for each of the spindles supporting cutters 27. It will be noted that these gears 62 to 66 inclusive are mounted in two horizontal planes, alternate gears being in the same plane. From this, it will be seen that a single drive is employed for rotating the plurality of spindles and, since they are duplicates of one another, it is deemed sufficient to describe in detail but one of them. Accordingly, gear 62 is keyed to a sleeve 67 having telescopic driving engagement with a vertical shaft 68, upon one end of which is integrally formed a bevel pinion 69. The pinion 69 and shaft 68 are mounted in suitable anti-friction bearings carried by sleeve 70 depending from the spindle housing 71. Bevel pinion 69 is enmesh with a bevel gear 72, keyed or otherwise secured to a sleeve 73, which in turn is keyed to the spindle 74 which has the usual collet or the like 75 formed at one end thereof to receive a cutter 27.

From the foregoing description it will be understood that the prime mover or motor 32 is employed to rotate the horizontal spindles 74 which carry at one end the cutters 27. It will also be noted that this drive can be interrupted or broken only when the main clutch 40 is disengaged, thereby breaking the main transmission line 34.

The spindle 74 and cutter carried thereby are adapted to be axially adjusted toward and from the work piece, to enable the machine to be used for machining different sizes and kinds of work pieces. To this end the spindle 74 is mounted in anti-friction bearings 173 within a quill 174 surrounding the spindle 74. This quill has milled or formed thereon rack teeth 176 enmeshed with worm 177 loosely mounted on worm shaft 178. Shaft 178 is mounted in the spindle housing 71 and is restrained from axial movement, as is the worm 177. Worm 177 is provided on opposite ends with bosses 179 and 180, to which are respectively secured bevel pinion 181 and relatively narrow faced worm 182. Bevel pinion 181 is so mounted as to have no relative movement respecting its support, while worm 182 has a slight axial movement but no rotative movement relative to its supporting boss 180. Bevel pinion 181 is enmeshed with a second bevel pinion 183 integral with an actuating stem 184, which has a head 185 formed thereon for receiving a handle or wrench or the like for rotating the stem 184. Closing the end of pocket 186 in the spindle housing 71, which contains the worms 177 and 182 and the pinion 181, is a plug 187 in which one end of shaft 178 is journaled. Extending eccentrically through the plug 187 is a clamp pin 188 abutting on one end with clamp head 189 and on the other end with worm 182. A clamp bolt 190 extends through the clamp head 189 and is threaded into the end of shaft 178. When it is desired to adjust the cutter 27 toward or from the work piece, clamp bolt 190 is first loosened or backed away from clamp head 189 and then the stem 184 rotated in a clockwise or counter-clockwise direction, depending on whether or not the cutter is to be advanced toward or retracted from the work piece. After the cutter 27 has been adjusted, the clamp bolt is tightened. This causes the clamp head 189 to move axially toward worm 182 and moving with it clamp pin 188. Clamp pin 188 tends to axially move worm 182, thereby clamping the teeth of the worm 182 with the rack teeth 176 on the quill and locking the quill 174, spindle 74 and cutter 27 in the desired adjusted position.

In order to obtain the maximum result in production from a machine of this invention and to reduce to a minimum the time for completing a given work piece, there has been incorporated a rapid traverse or fast movement of the rotary table between the cutters and a slow or feeding movement of the table while the work pieces are being operated upon by the said cutters. The mechanism for accomplishing this plurality of movements of the table includes the following mechanism.

Figures 9, 10:
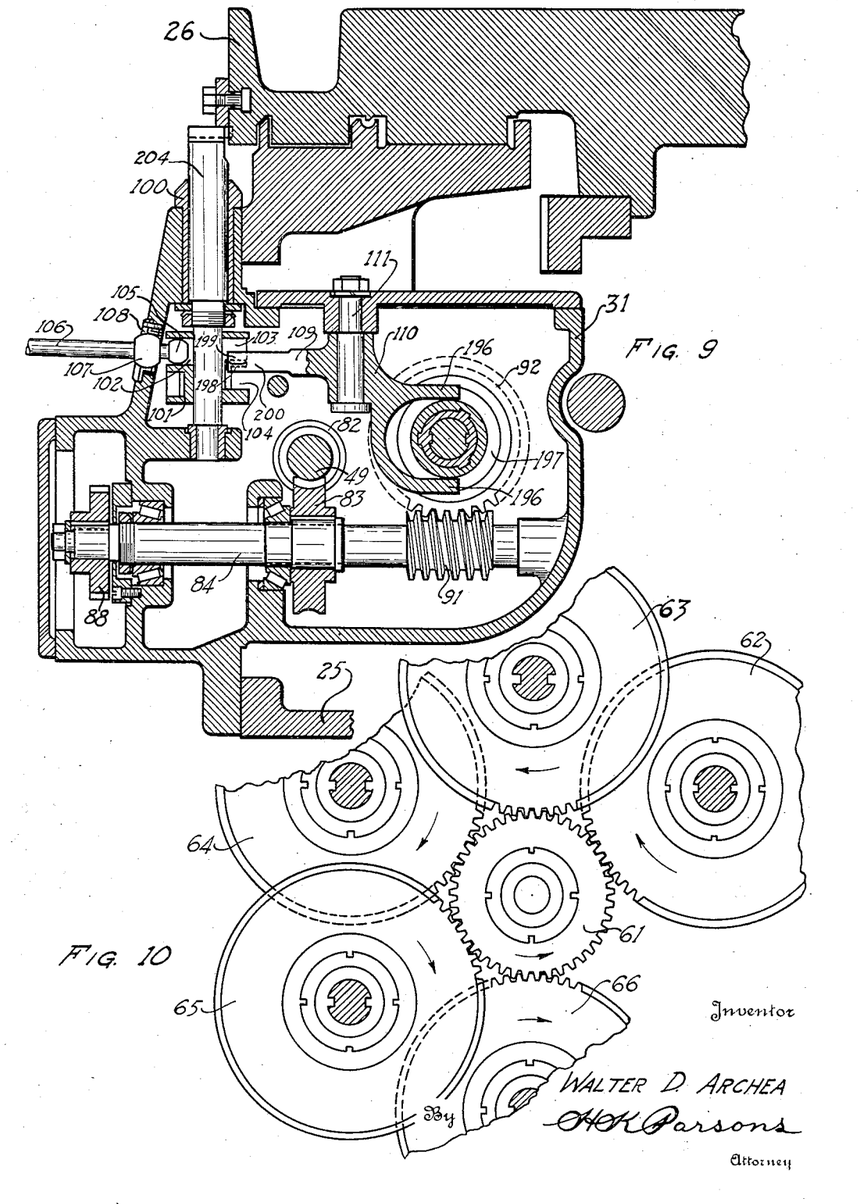
Figure 9 is a sectional view taken on line 9—9 of Figures 5 and 6.
Figure 10 is a sectional view taken on line 10—10 of Figure 8.
Figure 11:
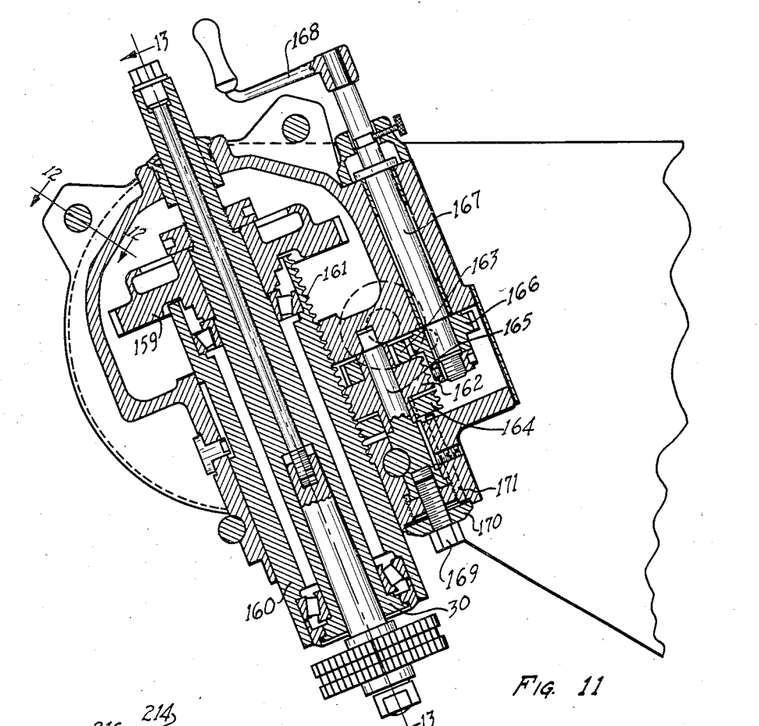
Figure 11 is a sectional view on line 11—11 of Figure 1.

Intermediate shaft 49 has mounted on the end opposite to the bevel gear 48 a hub or sleeve 76, to which alternate discs of friction disc clutch 77 are secured. The intermediate discs of this clutch are secured to cup-shaped flange 78, keyed or otherwise secured to worm shaft 79. The sleeve 76 is also provided with a flange, to which is pivotally mounted clutch fingers 80 adapted to be operated by clutch spool 81 splined to intermediate or driven shaft 49 for bringing into driving engagement the discs of friction clutch 77. Integral with or secured to the worm shaft 79 is worm 82 adapted to drive (see Figure 9) worm wheel 83 on shaft 84. The shaft 79 has keyed on the end thereof a pinion 85 enmesh with a gear 86 secured on countershaft 87 suitably journaled in antifriction bearings carried by the housing 36 of gear box 31. Worm shaft 79 is driven at a constant speed when the friction discs of clutch 77 are in driving engagement, and from this shaft the slow or feeding rate of movement, as well as the fast or rapid traverse rate of movement, for the table 26 is obtained. The slow or feeding rate of movement includes the following mechanism. On shaft 84 is secured to its outer end a pinion 88 enmesh with a similar pinion 89 on parallel shaft 90 extending transversely of the housing 36 and provided with a worm 91 enmesh with a worm wheel 92 loosely mounted on sleeve 93 carried by the countershaft 87. Secured to the worm wheel 92 is a ring member 94 having suitable clutch teeth 94a adapted to be engaged by the clutch teeth 95a of slidable clutch spool 95 splined on the countershaft 87. When the clutch teeth 94a and 95a are in engagement, the countershaft 87 is driven at a slow or feeding rate of speed. The fast or rapid traverse rate of movement includes the pinion 85 fast on worm shaft 79 meshing with the gear 86 loosely mounted on sleeve 98 carried by countershaft 87. This gear 86 is provided with clutch teeth 97 adapted to mesh with clutch teeth 96 formed on the other end of sliding clutch spool 95 so that when said clutch teeth 96 and 97 are in engagement, the countershaft will be driven at a fast or rapid traverse rate of speed.

From the foregoing description it will be noted that countershaft 87 may be driven at different speeds, depending upon whether clutch spool 95 is in engagement with clutch teeth 94A carried by worm wheel 92 or in engagement with clutch teeth 97 formed on gear 86. When the clutch 95 has been shifted to the left, as seen in Figure 5, the drive will be from intermediate shaft 49 through clutch 77 to worm shaft 79, thence through worm and worm wheel 82—83, through shafts and gears 84, 88, 89, and 90, to worm and worm wheel 91 and 92, through clutch 95 to countershaft 87, thereby rotating the countershaft 87 slowly while the work pieces are being fed into and past the cutters 27. If the clutch spool 95 is shifted to the right, the worm shaft 79 will be driven in the same way but there will be a direct connection between said worm shaft 79 and countershaft 87 through pinion 85, gear 86 and clutch 95, for rapidly rotating the countershaft 87 for rapidly shifting the work pieces between or from one cutter 27 to the next.

Figure 2:
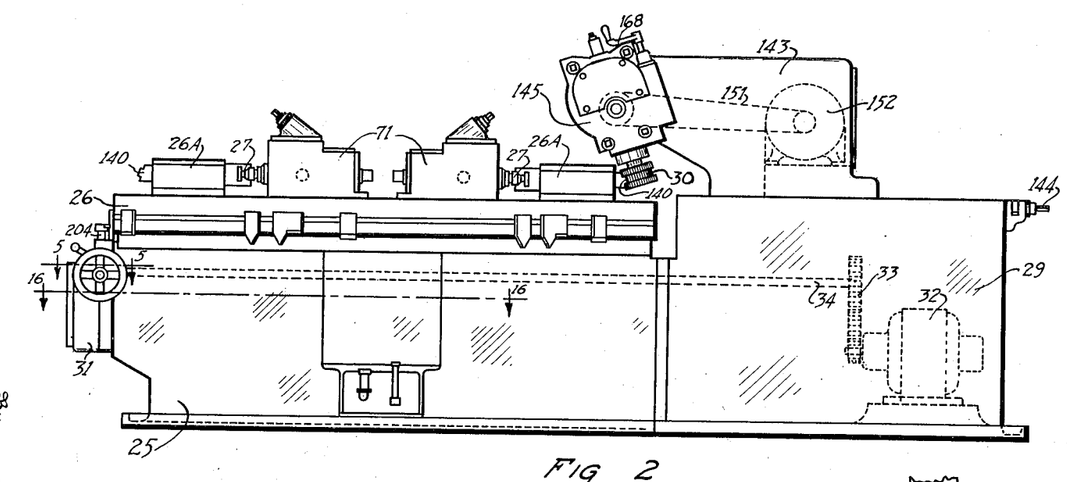
Figure 2 is a side elevation of the device shown in Figure 1.

The mechanism for operating the clutch spool 95 is controlled automatically by a plurality of dogs or actuating members secured to the circumferential flange of the table, one set of operating dogs being provided for each spindle. This mechanism includes a pair of plungers 99 and 99a, vertically shiftable through sleeves 100 carried by casing 36 at the forward portion of casing 36 at the front of the machine or to the left, as seen in Figure 2. The plungers 99 and 99a are each provided at their lower ends with rack teeth 112 enmesh with a pinion 113. Integral with the pinion 113 is a segmental gear 191 meshing with a segment formed on one end of an actuating arm 192. The arm 192 is actuated about its pivot 193 by the partial rotation of segmental gear 191 and the arm is provided on its other end with an enlarged portion which is received in a socket 194 formed in the forward portion of actuating member 101. The rocking of the arm 192 about its pivot causes a raising and lowering of the actuating member 101 relative to the rotatable plunger 204, to which it is slidably keyed as by key 195. The other side of segmental gear 191 is provided with notches 114 to receive the point 115 of spring controlled detent 116. This spring controlled detent yieldingly locks the plungers in their adjusted positions and prevents inadvertent actuation thereof. The control member 101 is provided in its forward portion with a second socket 102, in which is received the ball end 105 of universally manually shiftable lever 106. The lever 106 has a ball bearing portion 107 between its ends, received in a universal socket 108 about which the lever may be actuated to five different positions. Two of these positions are feed positions, two of them rapid traverse positions and one a stop position, as indicated on the dial shown in Fig. 6. The shifting of this lever 106 from the stop to any of the other positions, or from the center to the left or right thereof, shifts the clutch spool 95 from the neutral position shown in Figure 5 to the right or left into feeding or rapid traverse clutch engagement. This clutch 95 is shifted by a shifter fork 110, the arms 196 of which ride in groove 197 formed in the clutch 95. The fork 110 is pivoted at 111 and is provided with an arm 109, the end 200 of which is provided with an enlarged and a narrow portion, indicated at 198 and 199 respectively, for a purpose which will later appear. This end 200 of the arm 109 is received in a socket 103 formed in the rear portion of the actuating member 101. From this it will be understood that as the actuating member 101 is rotated or oscillated about the axis of rotary plunger 204, the shifter fork 110 will also be rotated or oscillated about its pivot for shifting the clutch 95. It will be understood that the movement of the shifter fork about its pivot should not be as great when shifting from either the feed or rapid traverse position to the neutral, as when shifting from either feed or rapid traverse position to the other. To this end the large and narrow portions 198 and 199 are utilized and are brought into operative engagement with the walls of the socket 103 when the actuating member is raised and lowered respectively. The actuating member 101 is additionally provided on the side adjacent the plunger 204 with a pair of plates 201 and 202 having respectively a single projecting point and a plurality of projecting points cooperating with a spring pressed load and fire device 203. The load and fire device 203 is utilized to prevent the actuating member 101 from being thrown or rotated beyond a given point and also acts as a load and fire device for throwing the clutch. The rotating or oscillating plunger 204 is provided on its upper end with a pair of wings 207 and 207a extending diametrically opposite one another on opposite sides of the plunger 204 and are adapted to be engaged by actuating dog 205 for rotating the said plunger 204 and actuating member 101. There is also adjustably secured to the circumferential flange of the table a feed setting dog 206 which also acts on the wings of the rotating plunger 204. The actuating dog 205 is provided with a depending lug 208 for actuating the plunger 99, and a third dog 209 is adjustably secured to the periphery of table 26 for actuating the plunger 99.

Figure 6:
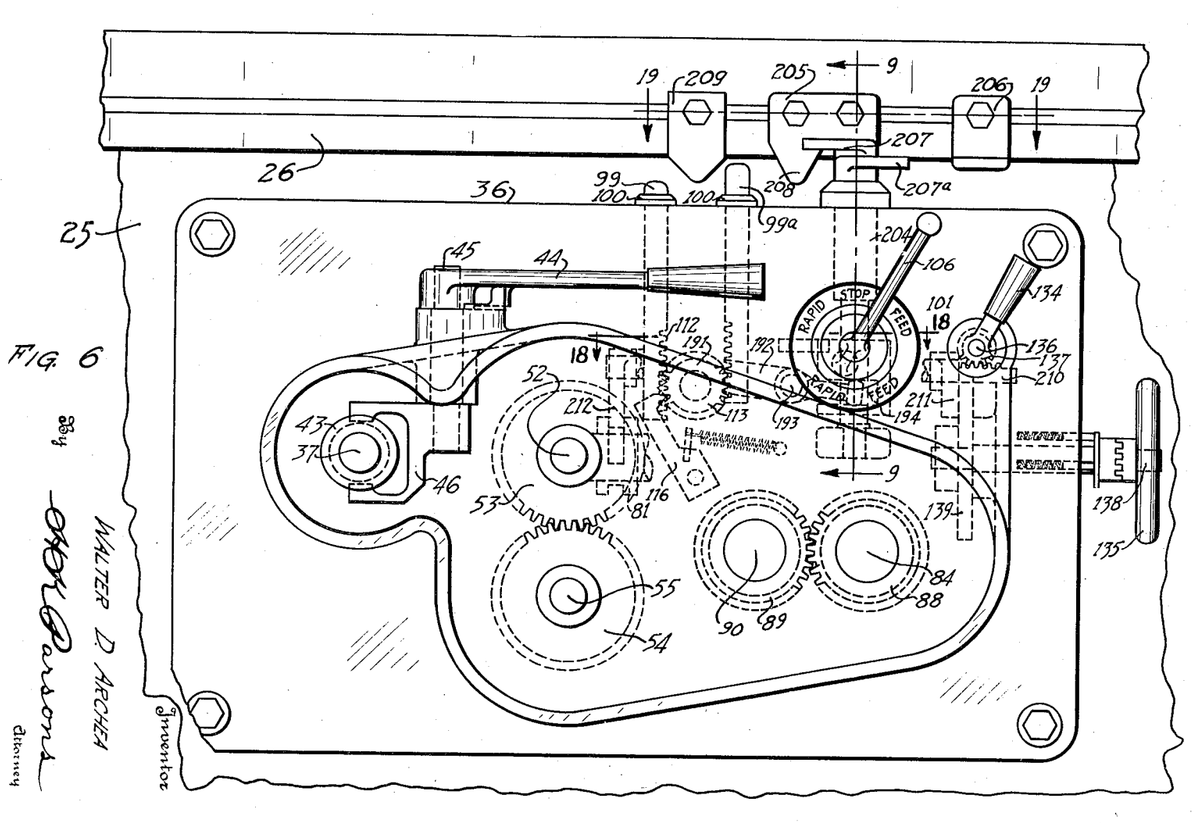
Figure 6 is a view of the gear box as seen from line 6—6 of Figure 5, with the front cover plate removed.

The operation of the above mechanism is as follows:

Referring to Figure 6 and assuming that the table is rotated in a counter-clockwise direction or to the right at a rapid traverse rate, the wing 207A on the oscillatable plunger 204 would be toward the table to be engaged by the feed dog 206. With the parts in this position the remaining dogs may be set to give two different cycles, one of which would be alternating, rapid traverse and feed, and the other rapid traverse, feed and stop. If set for the first cycle the feed dog 206 would engage the wing 207A of plunger 204 and move the plunger about its axis in a clockwise direction thereby rotating the actuating member 101 in a similar direction which in turn would shift the clutch 95 to the left as seen in Figure 5 changing the rate of the table from rapid traverse to feed. In this cycle the vertically shiftable plunger 99 would be up and the shiftable plunger 99A would be down and through the pinion 113, segmental gear 191, and actuating arm 192, the member 101 would be in a raised position so that the narrow portion 199 on the end 200 of shifter 110 would be within the walls of socket 103. Also the actuating member 101 would have its detent plate 201 having the two notches in alignment with spring controlled load and fire device 203. The rotation of the plunger 204 and the actuating member 101 carried thereby causes the load and fire device 203 to ride up the side of one notch in plate 201 during which time the lost motion between the narrow portion 199 and the slot 103 in the member 101 is taken up and the spring loaded or tensioned until the member 203 reaches the apex between the notches at which time the spring will expand or fire thereby rapidly rotating the plunger 204 and actuating member 101 to rapidly shift the clutch 95 from a rapid traverse position to a feed position. At completion of the feeding stroke a second dog 205 similar to the dog 206 will act on the other wing 207 of the plunger 204 to rotate it in a counter-clockwise direction to change from feed to rapid traverse.

If it is desired to have the table stopped after each feeding movement to insure that the operator is through changing the work, the dogs would be set as shown in Figure 6. In this cycle the operation would be the same as that just described to effect the change from rapid traverse to feed. At this stage it should be apparent that the mechanism must be changed in order that the next dog rotation of the plunger will only move the clutch 95 to the half way or stop position and not a complete movement to the rapid traverse position. To this end the dog 205 is provided with a lug 208 for engaging the plunger 99 and moving it down. This will effect oscillation of the gear 191 through pinion 113 which through the arm 192 will move the member 101 downward causing the slot 103 to engage the enlarged portion 198 of the arm 109 and move the detent plate 202 into engagement with the load and fire device 203.

After this movement has been completed, a dog 205 will engage the arm 207 of plunger 204 oscillating the same in a counter-clockwise direction. This will cause the load and fire device 203 to ride up the side of one of the exterior notches of the three which are formed in the plate 202 and since there is no lost motion between the portion 198 and arm 191, all will move together gradually withdrawing the clutch 95. When the load and fire device passes over the first peak it will drop into the center notch thereby holding the clutch in a neutral position and stopping the movement of the table. After the operator has completed changing the work, he then moves the control lever 106 to the left preferably to the lower left hand corner of the dial as shown in Figure 6. Should he fail to do this but simply move the lever to the upper left hand corner of the dial, a correcting dog 209 has been provided which engages the plunger 99A, which was moved up when the plunger 99 was moved down, moving the plunger 99A downward and thereby resetting the mechanism so that upon the next engagement of the wing 207A by the dog 206 the clutch 95 will be given a complete movement automatically. It will be seen that movement of the plunger 99A downward in turn resets the plunger 99 for the next cycle.

Figures 16, 17, 19:
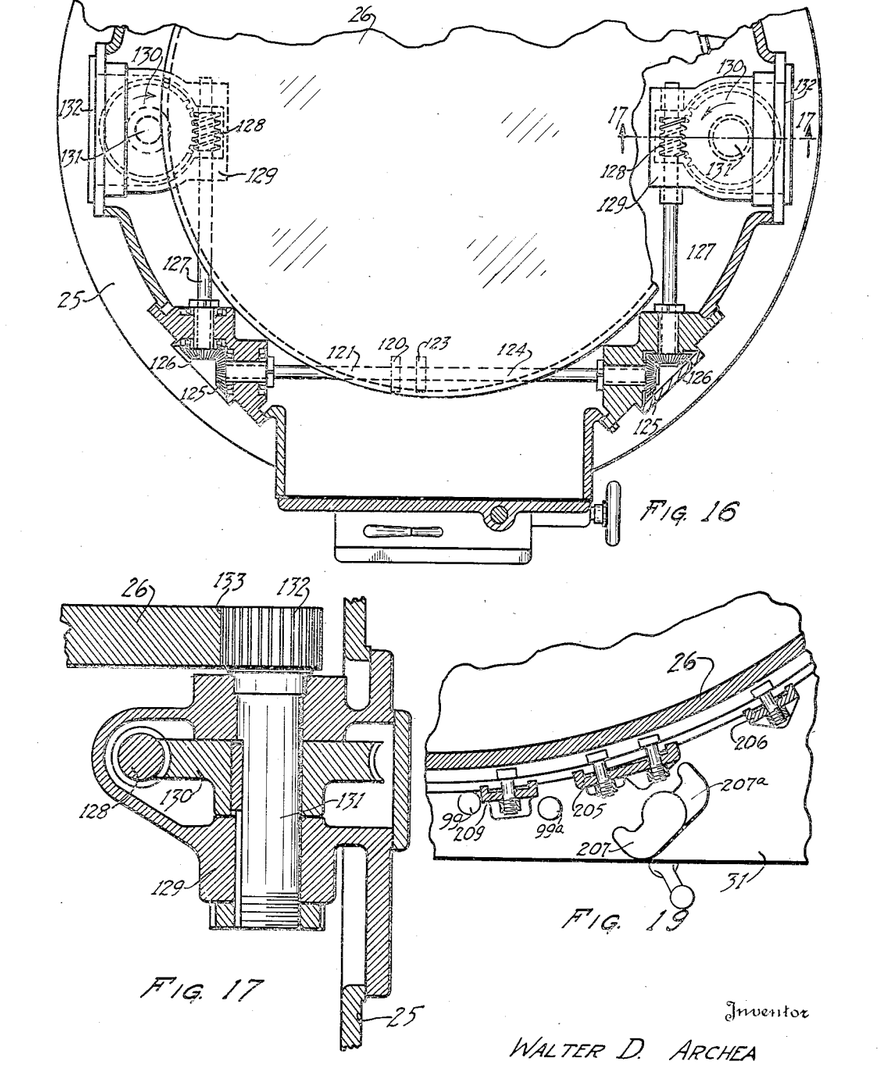
Figure 16 is a sectional view on line 16—16 of Figure 2 above the gear box, showing the drive to the rotary table.
Figure 17 is a sectional view on line 17—17 of Figure 16.
Figure 19 is a sectional view on line 19—19 of Figure 6.
Figure 18:
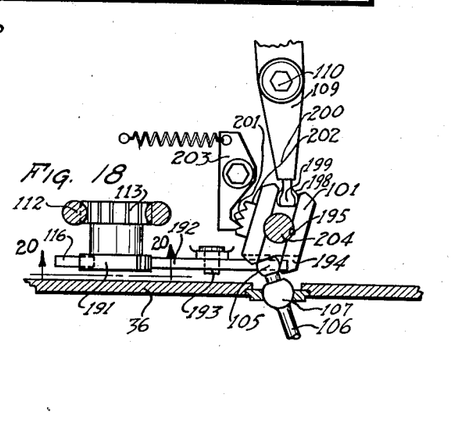
Figure 18 is a sectional view on line 18—18 of Figure 6, illustrating the automatic shift for the feeds and speeds.
Figure 20:
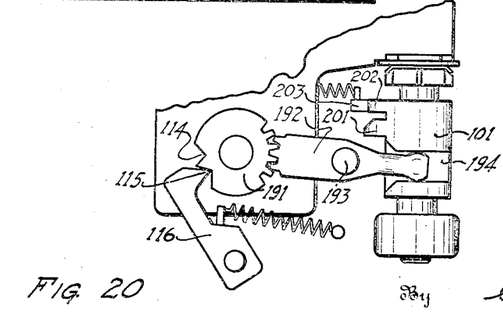
Figure 20 is a sectional view on line 20—20 of Figure 18.

From the foregoing it will be noted that an automatic means has been provided for actuating the countershaft 87 at a slow or feeding rate of speed while the work is being cut, and increasing or speeding up the rotation after completion of the cut on the work piece. The drive from the countershaft to the table is of a dual nature, and each drive being substantially the same, but one side thereof will be described in detail. Slidably keyed to the countershaft 87 is a double gear 118 having spiral teeth milled or cut therein, one side or gear 119 of which has the teeth at an angle extending from the outside toward the center thereof and is enmesh with a gear 120 on shaft 121. The other side, or gear 122, of double gear 118 has the teeth extending at the opposite angle to the teeth in gear 119 and is enmesh with gear 123 secured to shaft 124. Shafts 121 and 124 are separate and distinct shafts having their axes in alignment and driven in the same direction and at the same speed from double gear 118. The shaft 121 is provided (see Figures 16 and 17) on its opposite end with a beveled gear 125 enmesh with a beveled gear 126 on worm shaft 127. Worm shaft 127 has integral or secured thereto a worm 128 enclosed within a housing 129 secured internally of the bed 25. Meshing with worm 128 is worm gear 130, keyed or otherwise secured to vertical pinion shaft 131, which has at its upper end a pinion 132 meshing with a rack 133, formed integral with or secured to the rotary table 26.

It is to be understood that the teeth in gears 120 and 123 extend in the same direction as the teeth on gears 119 and 122, with which they mesh. It will also be noted that the gears 119 and 122 are somewhat wider than the gears meshing therewith. By this construction should the gears be out of alignment for proper driving connection, the double gear 118 will shift axially of the countershaft 87 until proper tooth contact is established between gears 120 and 123 and gears 119 and 122.

From the foregoing description it will be noted that the drive from the countershaft to the table is a variable one from slow or cutting speed to a high or rapid traversing speed, depending upon whether or not the countershaft 87 is being rapidly or slowly rotated through the shifter clutch 95.

It is sometimes desirable to manually rotate the table for setting up purposes and the like and at the same time have the cutters 27 rotating to obtain the proper position of the automatic actuating dogs. In order to cut off the power drive to the table, handle 134 (see Figure 6) would be shifted to the right, or in a clockwise direction, together with shaft 136 secured thereto. The shaft 136 has thereon a rack pinion 137 meshing with rack teeth formed in one end of clutch shifter rod 210, which has secured to its other end a shifter fork 212 to actuate the clutch spool 81. The shaft 136 has also secured thereto a shifter finger 211 adapted to engage one side of a gear 139 fixed on one end of slidable hand wheel shaft 138, which shaft has on its other end the hand wheel 135. By rotating the lever or handle 134 to the right, the shifter rod 210 would be shifted to the left and clutch 81 withdrawn from operative engagement with the friction discs, disconnecting the power drive to worm shaft 79. At the same time, shifter finger 211 would be shifted away from gear 139. The hand wheel 135 and shaft 138 would then be manually actuated to the left, as seen in Figure 6, for engaging the gear 139 with the pinion 85. Lever 106 would then be shifted into either rapid or feed positions and the hand wheel 135 rotated. This rotation will cause a rotation of the countershaft 87 and table 26 through the transmission line above noted.

Figures 3, 4:
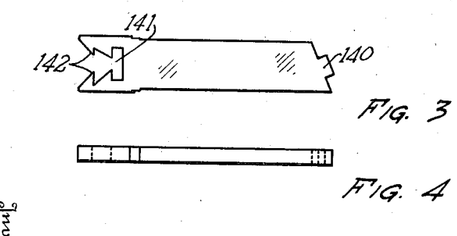
Figure 3 is a plan view of a work piece produced by the device shown in Figures 1 and 2.
Figure 4 is a side elevation of the work piece.

The foregoing description deals with the actuation of horizontal spindles and cutters 27 and with the rotation at variable speeds of the table 26 carrying on its upper surface the work pieces. In the embodiment selected for illustration of the invention, the work piece to be formed or cut is illustrated in Figures 3 and 4 and is known as a turbine blade or bucket. These blades or buckets are formed from a relatively narrow rectangular shaped piece of steel and are provided on the one end with a lug 140 and on the other end with a furcation 141, the arms of which furcation are provided with saw tooth-like steps 142. The furcation and saw teeth are formed by the cutters 27 through a continuous motion and are formed from the solid or rough blank. The mechanism for forming the lug 140 includes the vertical spindle 30, which will now be described.

Figure 12:
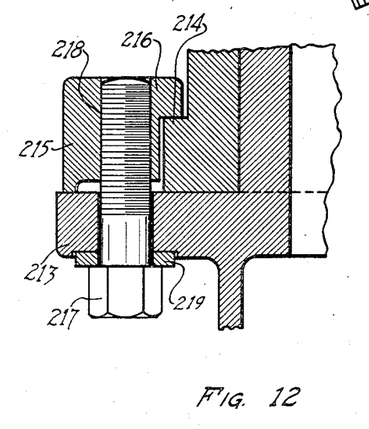
Figure 12 is a sectional view on line 12—12 of Figure 11.
Figures 13, 14:
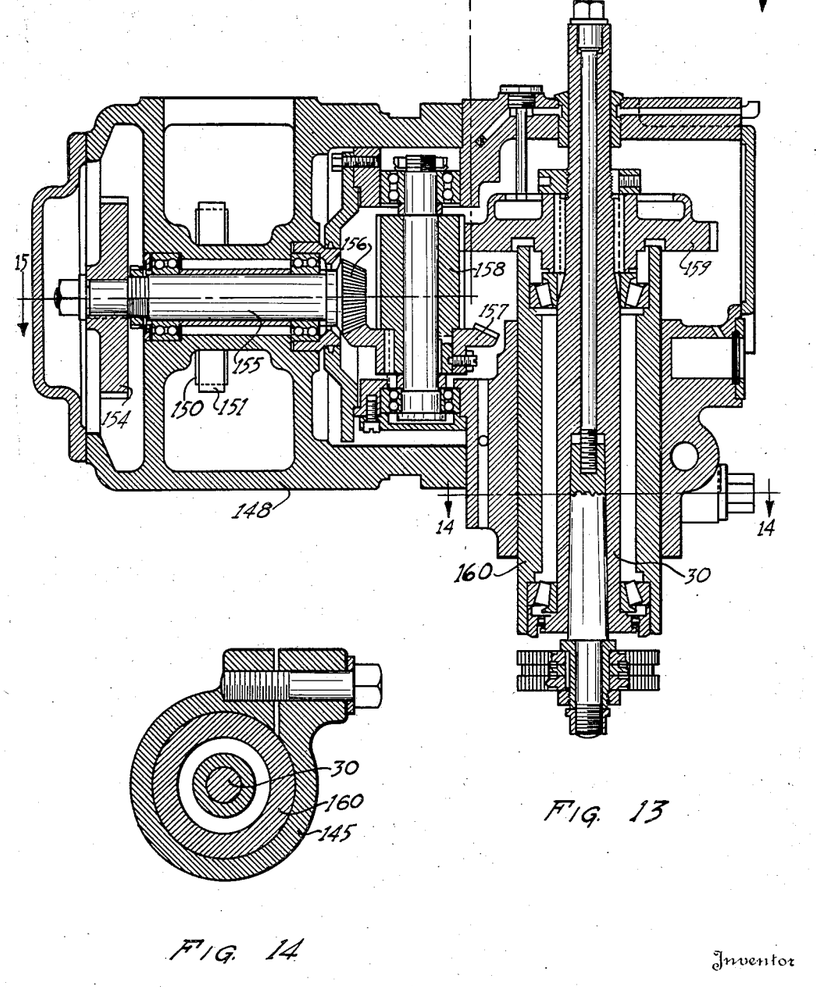
Figure 13 is a sectional view on line 13—13 of Figure 11.
Figure 14 is a sectional view on line 14—14 of Figure 13.
Figure 15:
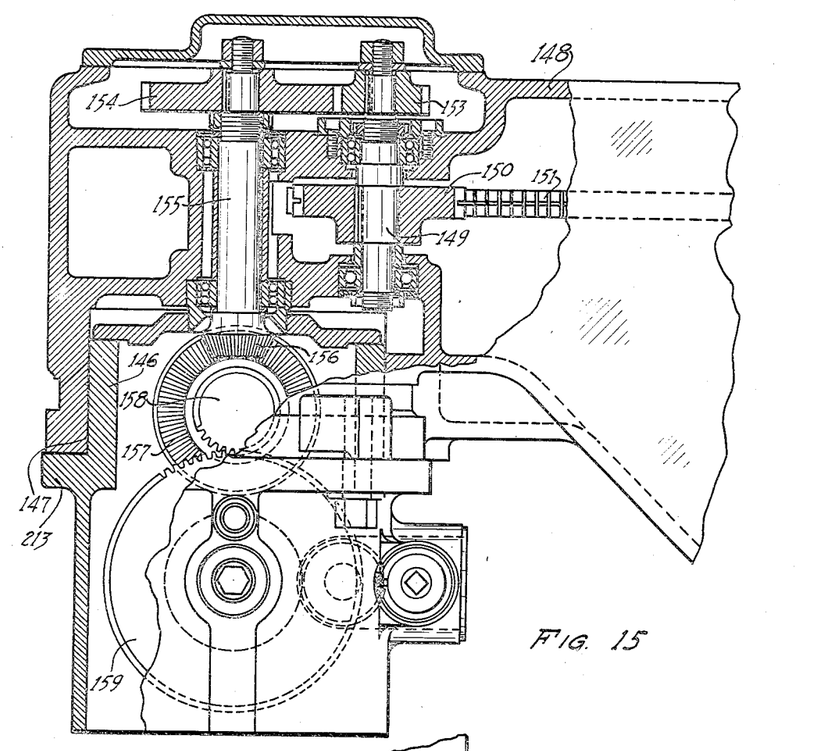
Figure 15 is a top plan view of the mechanism shown in Figure 13, having parts thereof broken away to better illustrate the structure.

Mounted above the motor housing 29 is a slide 143 adapted to be adjusted longitudinally of the housing 29 by a suitable screw or the like 144. The slide 143 has pivotally adjustable about a horizontal pivot at the forward end thereof a vertical spindle housing 145. The housing 145 is provided with a bearing sleeve 146 received within a bore 147 formed in the arm 148 integral with and extending from the slide 143. The bearing sleeve 146 constitutes the pivot about and on which the housing 145 turns. The housing is provided at the base of the bearing sleeve 146 with a flange 213 (see Figure 12) which extends somewhat beyond a similar flange 214 formed on the arm 148 against which it abuts. A clamp block 215 underlies the flange 213 and has a point contacting said flange 213 and a lug 216 underlying the arm flange 214. A clamp bolt 217 passes freely through a bore in the flange 213 into a threaded perforation 218 formed in the clamp block 215. The head of the clamp bolt 217 abuts a washer 219 on the outer surface of the flange 213. After the housing 145 has been adjusted to the desired position, the clamp bolt is tightened, drawing the clamp block 215 outwardly and clamping the flanges to one another between the head on the clamp bolt and the lug 216 on the clamp block.

The arm 148 has suitably journaled therein a short shaft 149 mounted in anti-friction bearings and has keyed or otherwise secured thereto a gear, pulley or the like 150, about which extends silent chain 151 driven from a motor 152 interiorly of the slide 143. Shaft 149 has keyed to its outer end a pinion 153 enmesh with a gear 154, keyed or otherwise secured to the stem 155 of bevel pinion 156. Rotation is imparted by motor 152 through silent chain 151 to the shaft 149, then through gears 153 and 154 to bevel pinion 156. Pinion 156 is journaled in anti-friction bearings carried by the walls of the arm 148 and is enmesh with a bevel gear 157, secured to a boss integral with elongated gear 158. It will be noted that gear 158 has a relatively wide face and meshes with a relatively narrow face gear 159, keyed to vertical spindle 30. Spindle 30 is adapted to be axially adjusted and to this end is provided with a quill 160, in which is formed rack teeth 161 adapted to mesh and be engaged by a worm 162. Worm 162 is formed on one end with a pinion 163 and on the other end with a relatively narrow worm 164. Worm 162 and associated pinion and worm 163 and 164 are adapted to be rotated about the axis of a pin 165. Meshing with the pinion 163 is a second pinion 166 secured to a shaft 167, so as to rotate therewith, and is adapted to be manually actuated by a crank or the like 168. Threadedly received in the pin 165 is a bolt 169 having mounted thereabout a plate 170 of relatively large circumference and adapted to engage one end of a pin 171 loosely mounted in the spindle cutter housing, having its other end in engagement with the relatively narrow worm 164. When it is desired to axially adjust the spindle 30, screw 169 is loosened to remove the pressure from sliding pin 171. Crank 168 may then be turned and through the engagement of gears 163 and 166, rotation imparted to worm 162, causing the quill 160 which carries the spindle 30 to be axially adjusted. The clamp bolt is then tightened, actuating the sliding pin 171 toward the narrow worm 164, causing the teeth thereof to clamp with the rack on the quill 160, clamping same in adjusted positions together with the spindle 30.

Figure 1:
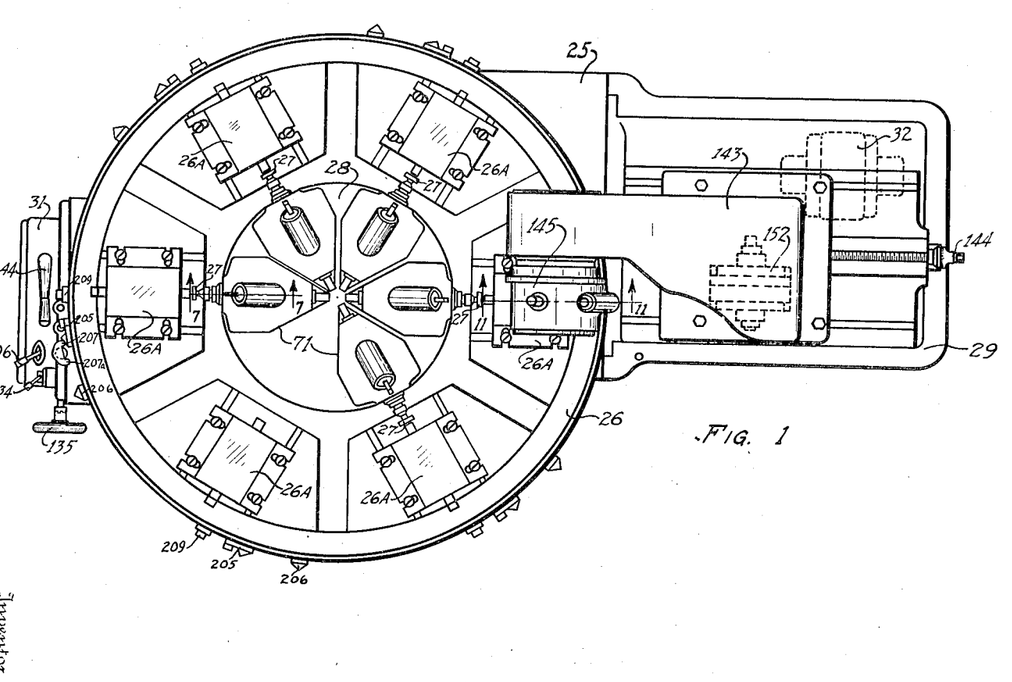
Figure 1 is a top plan view of a device of this invention.

The operation of this device is as follows:

By reference to Figure 1 it will be noted that the rotating table has six stations or places, at which points the work pieces are mounted. Also, the pedestal supports but five cutter spindles 74, leaving one work place without a cutter spindle. This is known as the loading station, at which point the finished work piece is removed from the machine and an unfinished piece placed thereon. After the work piece has been mounted on the table, the operator grasps and actuates the manual shifter lever 106 from the stop or central position to the lower lefthand corner of the dial, into a rapid traverse position, thereby causing the table to be rapidly rotated, advancing the unfinished work piece to the first of the cutter tools 27. Rotation of the table causes feed dog 206 to engage one of the wings of oscillatable plunger 204 for shifting the clutch 95 out of engagement with clutch teeth 97 into engagement with clutch teeth on worm wheel 92 for slowing down the table to a feeding rate. At this time, another finished work piece has been brought to the loading station, where it is removed and an unfinished piece placed thereon while the work pieces are being operated upon by the rotating cutters 27. Continued rotation of the table causes lug 208 of the actuating dog 205 to depress plunger 99 for setting the clutch actuating mechanism in position for stopping the rotation of the table upon engagement of the oscillatable member 204 with the actuating dog 205. The table is started by moving lever 106 to the lower left hand position resetting plunger 99 but if the plunger is only moved to the upper left hand position the correcting dog 209 will engage shiftable plunger 99A thereby resetting plunger 99 for subsequent engagement by dog 208 on the next cycle.

It is believed that in view of the foregoing description, the automatic shifting and control of the rotation of the table will be thoroughly understood.

What is claimed is:

1. In a milling machine the combination of a rotary table adapted to support a plurality of work pieces, means for rotating the table at variable speeds including a main transmission line, an intermediate shaft driven from the transmission line, a countershaft, a direct pinion and gear connection between the intermediate and countershaft normally inoperative, a worm and worm wheel connection between the intermediate and countershaft normally inoperative, a second transmission shaft extending from the countershaft to the table for rotating same, and means for operatively connecting either the direct pinion and gear drive or worm and worm wheel drive with the countershaft.

2. In a milling machine the combination of a rotary table adapted to support a plurality of work pieces, means for rotating the table at variable speeds including a main transmission line, an intermediate shaft driven from the transmission line, a countershaft, a direct pinion and gear connection between the intermediate and countershaft normally inoperative, a worm and worm wheel connection between the intermediate and countershaft normally inoperative, a second transmission shaft extending from the countershaft to the table for rotating same, and means for operatively connecting either the direct pinion and gear drive or worm and worm wheel drive with the countershaft, said last mentioned means including a manually shiftable lever and a clutch to be shifted by the lever.

3. In a milling machine the combination of a rotary table adapted to support a plurality of work pieces, means for rotating the table at variable speeds including a main transmission line, an intermediate shaft driven from the transmission line, a countershaft, a direct pinion and gear connection between the intermediate and countershaft normally inoperative, a worm and worm wheel connection between the intermediate and countershaft normally inoperative, a second transmission shaft extending from the countershaft to the table for rotating same, means for operatively connecting either the direct pinion and gear drive or worm and worm wheel drive with the countershaft, and additional automatic means for shifting the last mentioned means controlled by the table during its movement.

4. In a device of the class described, the combination of a rotary table for supporting a plurality of work pieces, means for rotating the table at variable speeds including a shaft and a clutch slidable thereon, a pivoted clutch fork for shifting the clutch, an oscillatable member, an actuating member operatively connected to the clutch shifter and slidably connected to the oscillatable member, means cooperating with the shifter fork for determining the throw thereof, and means for adjustably positioning the actuating member relative to the last mentioned means for throwing the clutch the predetermined amount.

5. In a milling machine the combination of a bed, a table mounted for rotation relative to the bed, a plurality of cutter spindles, a main transmission line, a branch transmission line in series therewith for effecting the rotation of the spindles, high speed and low speed branch transmission lines arranged in parallel relationship with one another in series with the main transmission line for rotating the table, means for connecting either the low speed or high speed transmission lines with the table, means for disconnecting the high and low speed transmission lines from the main transmission line, and manual means interlocked with the main transmission line for manually rotating the table when the power thereto is disconnected by the last mentioned means.

6. In a milling machine the combination of a bed, a table mounted for rotation relative to the bed, a plurality of cutter spindles, a main transmission line, high speed and low speed branch transmission lines arranged in parallel relationship with one another in series with the main transmission line for rotating the table, means for connecting either the high speed or low speed transmission lines with the table including a slidable clutch adapted to be shifted to a position for connecting either the high or low speed branch transmission lines with the table or to a neutral position for connecting neither of the transmission lines with the table, a pivoted shifter member for the slidable clutch, an actuator for the shifter, an oscillatable member slidably connected to the actuator, means on the shifter cooperating with the actuator for determining the throw of the slidable clutch either to the neutral position or to a position for connecting either of the branch transmission lines with the table, and means for adjusting the actuator relative to the last mentioned means.

7. In a milling machine the combination of a bed, a table mounted for rotation relative to the bed, a plurality of cutter spindles, a main transmission line, high speed and low speed branch transmission lines arranged in parallel relationship with one another in series with the main transmission line for rotating the table, means for connecting either the high speed or low speed transmission lines with the table including a slidable clutch adapted to be shifted to a position for connecting either the high or low speed branch transmission lines with the table or to a neutral position for connecting neither of the transmission lines with the table, a pivoted shifter member for the slidable clutch, an actuator for the shifter, an oscillatable member slidably connected to the actuator, means on the shifter cooperating with the actuator for determining the throw of the slidable clutch either to the neutral position or to a position for connecting either of the branch transmission lines with the table, means for adjusting the actuator relative to the last mentioned means, and additional means carried by the table for controlling the actuator adjusting means and for oscillating the oscillatable member for effecting the throw of the clutch.

8. In a milling machine the combination of a bed, a rotary table carried thereby, a plurality of horizontal rotating cutters for operation on a portion of work pieces carried by the table, a prime mover, a main transmission line operated thereby, a branch transmission line in series with the main transmission line for rotating the cutters, parallel high speed and low speed branch transmission lines for rotating the table correspondingly, a substantially vertical rotating cutter for operation on another portion of the work pieces, a second prime mover, and a transmission line from the second prime mover to the vertical cutter for rotating same.

9. In a milling machine the combination of a bed, a rotating table carried thereby, a main transmission line, a countershaft, parallel high speed and low speed transmission lines in series with the main transmission line for rotating the countershaft correspondingly, a pair of driven shafts adapted to be driven from the countershaft and to rotatively drive the table at two points thereon, and a flexible connection between the countershaft and driven shafts for rotating the driven shafts at a constant speed and in a given direction.

10. In a machine tool organization the combination of a support, a rotating table carried thereby, a transmission line for rotating the table, means operated by the rotation of the table for connecting and disconnecting the transmission line with the table including a clutch, a shifter for the clutch, an actuator for the shifter, means on the actuator determining the amount of throw thereof and a load and fire device co-operating with the actuator determining means for controlling the throw of the actuator, a reciprocating plunger adapted to be reciprocated by the rotating table, and means operatively connecting the reciprocating plunger with the actuator for adjusting the operative relation between the actuator and the load and fire device.

11. A machine of the class described having in combination a movable support, a transmission for imparting movement thereto including rate determining means and stop means, a common actuator for said means including a rotatable plunger, a trip mechanism for selecting the means to be actuated by the plunger, and additional trip mechanism for rotating said plunger and thereby actuating the selected means.

12. A machine of the class described having in combination a movable support, a power transmission for imparting motion to the support including rate determining means and stop means, a common actuator for said means including a rotatable plunger, load and fire mechanism adapted to be associated with the plunger to control said rate determining means, additional load and fire mechanism adapted to be associated with said plunger to control said stop means, and trip actuated control devices for predetermining the load and fire mechanism to be associated with the plunger and thereby the means to be effected upon rotation thereof.

13. A milling machine having a work table, a spindle support adjacent the table, a spindle quill slidably mounted in the support, a cutter spindle journaled in the quill, means to adjust the quill axially and thereby the cutter spindle relative to the table including rack and worm means, said worm being fixed against longitudinal movement, manual means for rotating said worm, an additional worm engaging the rack and axially movable relative to the fixed worm, and means to clamp the two worms together to locate the quill and spindle in the support.

14. In a milling machine the combination of a bed, a rotatable table carried thereby, a main transmission line, a counter shaft, high speed and low speed transmission lines arranged in parallel relation to one another in series with the main transmission line for rotating said counter shaft, a pair of driven shafts, means coupling each driven shaft to opposite sides of the table for rotation thereby, a double spiral gear on the counter shaft, the teeth on the gears converging toward one another, separate spiral gears on the driven shafts engaging said double gear for rotating the driven shafts at a constant speed and in a given direction.

15. A milling machine having in combination a bed, a rotary table carried by the bed, a plurality of work holders circumferentially arranged on said table, each radially positioned a predetermined amount with respect to the axis of the table, a stationary pedestal centrally of the table, a plurality of rotatable cutting tools carried by the pedestal, there being one tool for each work holder, means to adjust the cutters radially into the rotary path of one end of the work pieces, additional means adjacent to the circumference of the table for supporting an additional cutter, means to adjust said cutter in a radial direction into the path of the exterior ends of the work carried by the holders, means to adjust the axis of said additional cutter whereby one end of the work may be finished to a different plane than the opposite end, means to continuously rotate the work table to finish both ends of the work simultaneously.

16. In a milling machine the combination of a bed, a table mounted for rotation relative to the bed, a plurality of cutter spindles, a main transmission line, a branch transmission line in series therewith for effecting rotation of the spindles, parallel high speed and low speed branch transmission lines in series with the main transmission line for rotating the table, means for connecting either the low speed or high speed transmission lines with the table, an oscillatable member operatively connected with the last mentioned means for controlling the same, means carried by the rotating table for actuating the oscillatable member to change the rate of table movement, and additional means carried by the table for changing the relation between the oscillatable member and said connecting means whereby subsequent actuation of the oscillatable member will stop the movement of the table.

17. In a milling machine the combination of a bed, a table mounted for rotation relative to the bed, a plurality of cutter spindles, a main transmission line, a branch transmission line in series with the main line for effecting rotation of the spindles, high speed and low speed branch transmission lines arranged in parallel relationship with one another and in series with the main transmission line for rotating the table, means for connecting either the low speed or high speed line with the table including a slidable clutch, a pivoted member for shifting the clutch, an oscillatable member, an actuator for the pivoted member carried by the oscillatable member, said actuator being fixed for rotary movement with the oscillatable member but axially movable relative thereto for changing the operative relation to the pivoted member, means carried by the table for actuating the oscillatable member and supporting the actuator for shifting the clutch to change the rate of table movement, and additional means carried by the table and effective on said actuator to axially move the same whereby subsequent operation of the oscillatable member will effect stoppage of the table.

18. In a device of the class described, the combination of a rotary table for supporting work in adjacent relation to a cutter, means for rotating the table at variable speeds including a shaft having spaced final members thereon, a feed train for actuating one of said members, a quick traverse train for actuating the other member, a clutch slidably mounted on the shaft for coupling either or neither member to the table, a clutch shifting fork, an oscillatable trip plunger, an intermediate member operatively connecting the trip plunger to the clutch fork, said intermediate member being variously positioned with respect to the trip plunger and the shifter fork for determining the amount of movement to be imparted to said fork by the plunger, means for positioning the intermediate member including trip actuable and manually operable devices, and detent means for maintaining the intermediate member in its adjusted positions.

19. In a device of the class described the combination with a rotatable cutting means of a rotary table for supporting work in cooperative relation to the cutting means, transmission mechanism for rotating the table at variable speeds including a shaft having spaced final actuators mounted for free rotation thereon, means for rotating said actuators at different rates respectively including a prime mover, a feed train extending from the prime mover to one actuator, a quick traverse train extending from the prime mover to the other actuator, a clutch slidably mounted on the shaft for coupling either actuator to the table, said clutch having an intermediate or neutral position, means for shifting said clutch including a clutch fork, an oscillatable trip member, an intermediate member for variously coupling the trip member to the clutch fork, trip dogs carried by the table for oscillating said trip member, means for positioning said intermediate member whereby the trip dogs will shift the clutch from one engaged position to the other, and additional means for positioning said intermediate member whereby the dogs will shift the clutch from either engaged position to a neutral position.

20. In a device of the class described, the combination with a rotatable cutting means of a rotary table for moving work past the cutting means to effect a milling operation, means for rotating the table including a shaft having a clutch slidably mounted thereon, a pair of actuators mounted for free rotation on the shaft on opposite sides of the clutch, a prime mover, a feed train extending therefrom to one actuator, a quick traverse train extending from the prime mover to the other actuator, an auxiliary control for connecting and disconnecting both trains simultaneously from the prime mover control means for the clutch including a trip member, a clutch fork, an intermediate member coupling the trip member to the clutch fork, a trip dog carried by the table and effective on said trip member for shifting the clutch from either engaged position to an opposite engaged position, and means to adjust said intermediate member to change the effect of said dog.

21. In a device of the class described, the combination with a rotatable cutting means of a rotary table for moving work past the cutting means to effect a milling operation, means for rotating the table including a shaft having a clutch slidably mounted thereon, a pair of actuators mounted for free rotation on the shaft on opposite sides of the clutch, a prime mover, a feed train extending therefrom to one actuator, a quick traverse train extending from the prime mover to the other actuator, an auxiliary control member for connecting and disconnecting both trains simultaneously with respect to the prime mover, control means for the clutch including a trip member, a pivoted clutch fork, an intermediate member coupling the trip member to the clutch fork, a trip dog carried by the table for shifting the trip member and thereby the clutch from either engaged position to a neutral position, and means for positioning said intermediate member to change the effect produced by said dog.

22. In a milling machine the combination of a support, a table mounted for rotation relative to the support, a rotatable cutting means adjacent the table for milling work carried thereby, transmission mechanism for actuating said parts including a prime mover, a main transmission line, a first branch transmission extending to the cutting means, high speed and low speed branch transmissions arranged in parallel for actuating said table, a first clutch in said main transmission line for disconnecting the prime mover from all the branch transmissions, a second clutch in the main transmission line for disconnecting the prime mover from the table transmission lines, means for connecting either the high speed or low speed transmission lines with the table including a slidable clutch adapted to be shifted to a position for connecting either the high or low speed branch line with the table or to a neutral position for connecting neither of the transmission lines to the table, a pivoted shifter member for the slidable clutch, an actuator for the shifter, an oscillatable member slidably connected to the actuator, means on the shifter cooperating with the actuator for determining the throw of the slidable clutch either to the neutral position or to a branch line connecting position, and means for adjusting the actuator relative to the last mentioned means.

23. In a device of the class described the combination with a rotatable cutting means of a rotary table for supporting work in cooperative relation to the cutting means, transmission mechanism for rotating the table at different rates including a shaft having spaced final actuators mounted for free rotation thereon, means for rotating said actuators at different rates respectively including a prime mover, a feed train extending from the prime mover to one actuator, a quick traverse train extending from the prime mover to the other actuator, a clutch slidably mounted on the shaft for coupling either actuator to the table, said clutch having an intermediate or neutral position, means for shifting said clutch including a shifter fork, an oscillatable trip member, an intermediate member positively connected to the trip member for oscillation therewith, said intermediate member being independently movable with respect to the trip member to different positions for varying the degree of coupling between the trip member and the clutch fork, trip dogs carried by the table for oscillating said trip member and thereby shifting of the clutch fork, a first dog actuated trip plunger for positioning said intermediate member whereby the clutch will be moved from one extreme position to the other, a second dog actuated trip plunger for shifting said intermediate member to a second position whereby oscillation of the trip member will shift the clutch from either engaged position to a neutral position.

24. In a device of the class described the combination with a rotatable cutting means of a rotary table for supporting work in cooperative relation to the cutting means, transmission mechanism for rotating the table at different rates including a shaft having spaced final actuators mounted for free rotation thereon, means for rotating said actuators at different rates respectively including a prime mover, a feed train extending from the prime mover to one actuator, a quick traverse train extending from the prime mover to the other actuator, a clutch slidably mounted on the shaft for coupling either actuator to the table, said clutch having an intermediate or neutral position, means for shifting said clutch including a shifter fork, an oscillatable trip member, an intermediate member positively connected to the trip member for oscillation therewith, said intermediate member being independently movable with respect to the trip member to different positions for varying the degree of coupling between the trip member and the clutch fork, trip dogs carried by the table for oscillating said trip member and thereby shifting of the clutch fork, a first dog actuated trip plunger for positioning said intermediate member whereby the clutch will be moved from one extreme position to the other, a second dog actuated trip plunger for shifting said intermediate member to a second position whereby oscillation of the trip member will shift the clutch from either engaged position to a neutral position, manual means for shifting said intermediate member to effect re-engagement of the clutch, and trip means engageable with said first plunger for repositioning said intermediate member for a recurring cycle.

25. In a milling machine the combination of a rotary table, means for rotating the table at a fast and a slow speed, said means including a gear and a worm wheel closely mounted on a common shaft and a clutch slidably keyed to the shaft for operatively connecting the gear or worm wheel with said shaft for rotating the shaft correspondingly, the clutch being adapted to be shifted from the worm wheel or gear to the other and to an intermediate position between the two, a pivoted clutch shifter fork for shifting the clutch, a trip member and means mounted on the trip member for movement relative thereto and with respect to the shifter fork for determining the amount the clutch is to be shifted.

26. In a machine tool organization the combination of a support, a rotating table carried thereby, a transmission line for rotating the table and means operated by the rotation of the table for connecting and disconnecting the transmission line with the table including a clutch, a shifter for the clutch, a trip member mounted adjacent the table and fixed against axial movement, an actuator for the shifter carried by the trip member, said actuator being fixed for rotary movement with the trip member but for independent movement axially of the trip member, means on the actuator determining the amount of clutch movement for each position of the actuator, and a load-and-fire device cooperating with the actuator determining means for controlling the throw of the actuator in its different positions relative to the trip member.

WALTER D. ARCHEA.